United States Patent
Takemoto et al.

(10) Patent No.: US 12,151,261 B2
(45) Date of Patent: Nov. 26, 2024

(54) COMPOSITION FOR FORMATION OF ZINC OXIDE THIN FILM, AND METHOD FOR PRODUCING A ZINC OXIDE THIN FILM

(71) Applicant: Tosoh Finechem Corporation, Shunan (JP)

(72) Inventors: Yujin Takemoto, Shunan (JP); Tsukasa Futagoishi, Shunan (JP); Masahiro Aoki, Shunan (JP)

(73) Assignee: TOSOH FINECHEM CORPORATION, Yamaguchi (JP)

( * ) Notice: Subject to any disclaimer, the term of this patent is extended or adjusted under 35 U.S.C. 154(b) by 811 days.

(21) Appl. No.: 16/971,765

(22) PCT Filed: Feb. 15, 2019

(86) PCT No.: PCT/JP2019/005552
§ 371 (c)(1),
(2) Date: Aug. 21, 2020

(87) PCT Pub. No.: WO2019/167669
PCT Pub. Date: Sep. 6, 2019

(65) Prior Publication Data
US 2021/0086227 A1 Mar. 25, 2021

(30) Foreign Application Priority Data
Feb. 28, 2018 (JP) .................. 2018-035780

(51) Int. Cl.
*B05D 5/06* (2006.01)
*B05D 1/26* (2006.01)
(Continued)

(52) U.S. Cl.
CPC .............. *B05D 5/061* (2013.01); *B05D 1/26* (2013.01); *C01G 9/02* (2013.01); *C09D 5/32* (2013.01);
(Continued)

(58) Field of Classification Search
CPC . B05D 5/061; B05D 1/26; B05D 1/02; C01G 9/02; C09D 5/32; C09D 7/20;
(Continued)

(56) References Cited

U.S. PATENT DOCUMENTS

2007/0116986 A1* 5/2007 Garg ................... C23C 16/407
427/248.1

FOREIGN PATENT DOCUMENTS

| CN | 103415576 A | 11/2013 |
| CN | 104254495 A | 12/2014 |

(Continued)

OTHER PUBLICATIONS

Janowitz et al., Experimental electronic structure of In2O3 and Ga2O3, 2011, New Journal of Physics, 13, 14 pages (Year: 2011).*

(Continued)

*Primary Examiner* — Stefanie J Cohen
*Assistant Examiner* — Ritu S Shirali
(74) *Attorney, Agent, or Firm* — Panitch Schwarze Belisario & Nadel LLP

(57) ABSTRACT

A composition is provided which contains an organic zinc compound represented by general formula $R^1$—Zn—$R^1$, in which $R^1$ represents a linear or branched alkyl group having 1 to 7 carbon atoms, and an organic metal compound containing a metal element whose oxide has a band gap smaller than 3.2 eV. The composition can be used to form a zinc oxide film by a droplet coating method, such as a spray coating method, at a base material temperature of less than 200° C. A method for producing a zinc oxide film involves coating the composition in the form of droplets at a base material temperature of less than 200° C. to form the zinc oxide film. Using this method, it is possible to provide a zinc (Continued)

oxide thin film having an ultraviolet ray absorption ability, excellent visible light permeability, and a thickness of 1 μm or less.

5 Claims, 1 Drawing Sheet

(51) Int. Cl.
  *C01G 9/02* (2006.01)
  *C09D 5/32* (2006.01)
  *C09D 7/20* (2018.01)
  *C09D 7/61* (2018.01)
  *C23C 18/12* (2006.01)
  *G02B 5/22* (2006.01)
(52) U.S. Cl.
  CPC ............... *C09D 7/20* (2018.01); *C09D 7/61* (2018.01); *C23C 18/1216* (2013.01); *C23C 18/1279* (2013.01); *G02B 5/223* (2013.01)
(58) Field of Classification Search
  CPC ........ C09D 7/61; C09D 1/00; C23C 18/1216; C23C 18/1279; G02B 5/223; G02B 5/208; C03C 17/25; C03C 2217/216; C03C 2218/112; C01P 2002/54; C01P 2006/60
  USPC .................................................. 106/287.18
  See application file for complete search history.

(56) References Cited

FOREIGN PATENT DOCUMENTS

| EP | 3088363 A1 | 11/2016 |
|---|---|---|
| JP | H07182939 A | 7/1995 |
| JP | 2008105313 A | 5/2008 |
| JP | 5288464 B2 | 9/2013 |
| JP | 5854176 B2 | 2/2016 |
| KR | 10-2014-0140654 A | 12/2014 |
| WO | 2010131621 A1 | 11/2010 |
| WO | 2011114998 A1 | 9/2011 |
| WO | 2012053542 A1 | 4/2012 |
| WO | 2013161735 A1 | 10/2013 |
| WO | 2015098992 A1 | 7/2015 |
| WO | 2016185939 A1 | 11/2016 |

OTHER PUBLICATIONS

Nair et al., A review on optical bandgap engineering in TiO2 nanostructures via doping and intrinsic vacancy modulation towards visible light applications, 2022, Journal of Physics D: Applied Physics, 55, 313003, 12pages (Year: 2022).*
Machine translation of WO 2013161735 A1 originally published Oct. 2013 to Takemoto et al. (Year: 2013).*
Shewale et al., H2S gas sensing properties of undoped and Ti doped ZnO thin films deposited by chemical spray pyrolysis, Journal of Aloys and Compounds, 2016, Journal of Alloys and Compounds, 684, 428-437 (Year: 2016).*
Office Action issued Sep. 15, 2021 in CN Application No. 201980016039.3 (with English Machine Translation).
International Preliminary Report on Patentability issued Sep. 10, 2020 in International Application No. PCT/JP2019/005552.
International Search Report and Written Opinion issued Sep. 4, 2019 in International Application No. PCT/JP2019/005552.
Examination Report issued Jun. 22, 2021 in IN Application No. 202017036879.
Office Action issued Mar. 27, 2023 in KR Application No. 10-2020-7022451 (with English machine Translation).
Sungkyunkwan, "The Titanium Dioxide—Zinc Oxide Complex Anti-Ultraviolet Functional Cosmetic Material Development" (2014) (brief English language summary included in Office Action).
Anon, Tin(II) oxide, Wikipedia, pp. 1-4 (2021).
Extended European Search Report issued Oct. 22, 2021 in EP Application No. 19761588.3.
Office Action issued Nov. 16, 2021 in JP Application No. 2018035780 (Machine English Translation).
Omata et al., "Wurtzite CuGaO2: A New Direct and Narrow Band Gap Oxide Semiconductor Applicable as a Solar Cell Absorber," Journal of the American Chemical Society, vol. 136, No. 9, pp. 3378-3381 (2014).
Takemo et al., "Growth of ZnO films using DEZ materials by spray method," The Japan Society of Applied Physics, vol. 71, p. 21-071 (2010).
Vlasov et al., "Band gap engineering and transport properties of Ba2IN2O5: effect of fluorine doping and hydration," Physical Chemistry Chemical Physics, vol. 21, No. 42, pp. 23459-23465 (2019).

* cited by examiner

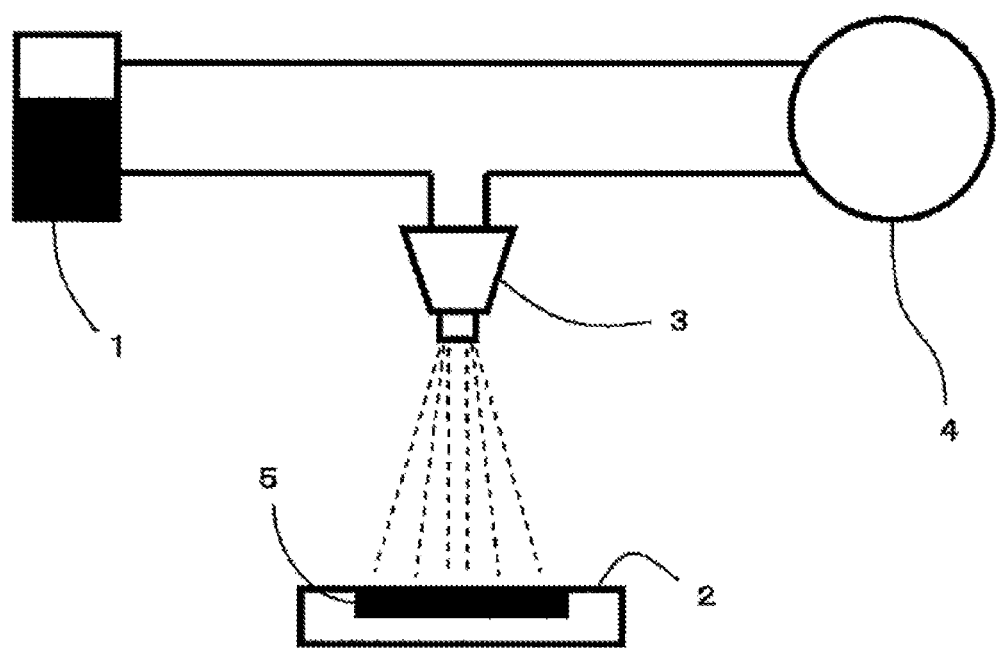

COMPOSITION FOR FORMATION OF ZINC OXIDE THIN FILM, AND METHOD FOR PRODUCING A ZINC OXIDE THIN FILM

CROSS-REFERENCE TO RELATED APPLICATIONS

This application is a Section 371 of International Application No. PCT/JP2019/005552, filed Feb. 15, 2019, which was published in the Japanese language on Sep. 6, 2019 under International Publication No. WO 2019/167669 A1, which claims priority under 35 U.S.C. § 119 (b) to Japanese Application No. 2018-035780, filed on Feb. 28, 2018, the disclosures of which are incorporated herein by reference in their entireties.

TECHNICAL FIELD

The present invention relates to a composition for a liquid drop coating method performed at a relatively low temperature, which enables production of a zinc oxide thin film having improved ultraviolet absorbing performance, and a method for producing a zinc oxide thin film having improved ultraviolet absorption performance using the same.

CROSS REFERENCE TO RELATED APPLICATION

This application claims priority to Japanese Patent Application No. 2018-35780, filed Feb. 28, 2018, the entire disclosure of which is specifically incorporated herein by reference.

BACKGROUND OF THE INVENTION

Ultraviolet absorption films with high transmittance in the visible light region are widely used in semiconductors, displays, lights, cars, window glasses, furniture, packaging containers, and the like.

A zinc oxide film is known as a product which has high transmittance in the visible light region and also has ultraviolet absorption property and is used as an ultraviolet blocking film (e.g., Patent Reference 1). In Patent Reference 1, a zinc oxide film is formed by a CVD method or a vacuum vapor deposition method.

A transparent zinc oxide film for ultraviolet absorption purposes has been studied from the viewpoints of processability, weight reduction, and the like in various applications for base materials that cannot be heated at elevated temperatures such as plastics and thin glasses, and further for base materials of various shapes. Therefore, when a zinc oxide film is formed, in order to prevent the base materials from being deformed or damaged, it needs to be carried out at a heat tolerance temperature or a relatively low temperature at which the base materials are not damaged by heat shock.

Patent Reference 2 describes a process for forming a zinc oxide thin film by heating a base material to 300° C. or less simultaneously with spray coating using, for example, a solution in which diethylzinc is dissolved an organic zinc compound in an electron-donating solvent. Examples of film formation at a base material temperature of 60° C. and examples of film formation without base material heating are described in the Examples.
Patent Reference 1: JP 2008-105313 A1
Patent Reference 2: JP 5288464 B
Patent Reference 3: JP H07-182939 A1

Patent Reference 2 discloses the invention aimed at providing a method of forming a zinc oxide thin film having excellent light transmittance in the visible light region but does not refer to ultraviolet absorption property of the formed zinc oxide thin film. Note that the film thickness of the zinc oxide thin film formed by one-time spray coating by the method described in Patent Reference 2 is several hundred nm and is an extremely thin film.

The inventors of the present invention examined whether the zinc oxide thin film produced by the process described in Patent Reference 2 could not be used as an ultraviolet blocking film. As a result, it has been found that ultraviolet absorption property of the thin film to be formed is greatly lowered when the base material temperature at the time of film formation is lower than 200° C.

On the other hand, in relation to the heat resistance of the base material, the lower the base material temperature, for example, at 160° C. or less, it can be used as an ultraviolet blocking film, and if a zinc oxide thin film having film thickness of about several hundred nm having excellent visible-light transmittance is obtained, the present inventors have considered that the utilization value is high.

The present invention has been made in view of the above problems. In other words, it is an object of the present invention to provide a zinc oxide thin film which has an absorbing ability of ultraviolet rays, particularly in UV-A range of 315 nm to 380 nm, is also excellent in visible light transmittance, and has a film thickness of 1 μm or less by a droplet coating method such as a spray coating method in which a base material temperature at the time of film formation is less than 200° C., and a means thereof.

Means for Solving the Problems

The inventors of the present invention intensively examined to solve the above problems. As a result, it has been found that, by adding an organic compound containing a metal element of which oxide having a smaller band gap than zinc oxide to a coating liquid containing an organic zinc compound, a zinc oxide thin film having improved ultraviolet absorption performance can be formed by a droplet coating method in which a base material temperature is less than 200° C. compared with a case where a coating liquid containing no metal element described above is used, and thus the present invention has been completed.

The present invention is as follows:

[1]
A composition for producing a zinc oxide thin film by a liquid drop coating method at a base material temperature of less than 200° C., comprising an organic zinc compound represented by the following general formula (1) and an organometallic compound, wherein a metal element contained in the organometallic compound is a metal element of which oxide has a band gap of smaller than 3.2 eV.

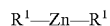
$$R^1\text{—}Zn\text{—}R^1 \tag{1}$$

In the formula, $R^1$ is a straight or branched alkyl group of 1-7 carbons.

[2]
The composition according to [1], wherein the metal element of the organometallic compound is titanium, iron, copper, or vanadium.

[3]
The composition according to [1], wherein the organometallic compound has an alkoxy group or an amino group as a ligand.

[4]

The composition according to [1], wherein content of the organometallic compound is such that a percentage (at %) of the metal element contained in the organometallic compound relative to the sum of zinc of the organic zinc compound and the metal element contained in the organometallic compound is in the range of 0.01 to 10.

[5]

The composition according to [1], wherein the organic zinc compound is diethylzinc.

[6]

The composition according to [1], wherein the composition further comprises an organic solvent.

[7]

The composition according to [6], wherein the organic solvent is an electron-donating organic solvent or a hydrocarbon compound.

[8]

A method of increasing UV-A blocking rate of a zinc oxide film formed by applying a coating liquid comprising an organic zinc compound represented by the following general formula (1) by droplet coating at a base material temperature of less than 200° C., wherein the coating liquid comprises an organometallic compound and the metal element contained in the organometallic compound is a metal element of which oxide has a band gap of smaller than 3.2 eV.

$$R^1—Zn—R^1 \quad (1)$$

In the formula, $R^1$ is a straight or branched alkyl group of 1-7 carbons.

[9]

The method according to [8], wherein when UV-A blocking rate of a zinc oxide film formed using a coating liquid not containing the organometallic compound formed at the same base material temperature is set to 100, UV-A blocking rate of a zinc oxide film formed using a coating liquid containing the organometallic compound is increased to 104 or more.

[10]

The method according to [8] or [9], wherein when the visible light region transmittance of a zinc oxide film formed using a coating liquid not containing the organometallic compound formed at the same base material temperature is set to 100, visible light region transmittance of a zinc oxide film formed using a coating liquid containing the organometallic compound is 80 or more.

[11]

A method for producing a zinc oxide film comprising droplet coating the composition according to any one of [1]-[7] at a base material temperature below 200° C. to form a zinc oxide film.

[12]

The method according to [11], wherein the droplet coating is performed under an atmosphere in which water is present.

[13]

The method according to [11] or [12], wherein when UV-A blocking rate of a zinc oxide film formed using a coating liquid not containing the organometallic compound formed at the same base material temperature is set to 100, a zinc oxide film having a UV-A blocking rate of 104 or more is obtained.

[14]

The method according to any one of [11] to [13], wherein when visible light region transmittance of a zinc oxide film formed using a coating liquid not containing an organometallic compound formed at the same base material temperature is set to 100, a zinc oxide film having a visible light region transmittance of 80 or more is obtained.

[15]

The method according to any one of [11] to [14], wherein the formed zinc oxide thin film has a thickness of 1 μm or less.

Advantageous Effect of the Invention

According to the present invention, it is possible to form a zinc oxide thin film having improved ultraviolet absorption performance as compared with a case where a coating liquid containing no metal element described above is used by a droplet coating method in which a base material temperature is less than 200° C.

As a result, it is possible to provide an ultraviolet absorption film having a high transmittance in the visible-light region 380 nm to 780 nm at a base material temperature of less than 200° C. and a high shielding factor in UV-A region 315 nm to 380 nm as compared with a coating liquid not containing the above-mentioned metal element to a base material that cannot be heated at 200° C. or more, such as plastics and thin plate glasses.

BRIEF DESCRIPTION OF THE DRAWINGS

FIG. 1 is a schematic diagram of a spray-film forming device.

EMBODIMENTS FOR IMPLEMENTING THE INVENTION

The present invention is described in more detail below.

Compositions for Producing Zinc Oxide Thin Film

A composition for producing a zinc oxide thin film of the present invention contains an organic zinc compound represented by the following general formula (1) and an organometallic compound, wherein a metal element contained in the organometallic compound is a metal element of which oxide has a band gap smaller than 3.2 eV and for formation of the zinc oxide thin film by a liquid drop coating method at a base material temperature of less than 200° C.

$$R^1—Zn—R^1 \quad (1)$$

In the formula, $R^1$ is a straight or branched alkyl group of 1-7 carbons.

Examples of alkyl groups of $R^1$ in compound represented by the generic formula (1) include methyl, ethyl, propyl, isopropyl, butyl, isobutyl, sec-butyl, tert-butyl, pentyl, isopentyl, neopentyl, tert-pentyl, hexyl, isohexyl, sec-hexyl, tert-hexyl, 2-hexyl, and heptyl groups, with methyl, ethyl, and propyl groups being preferred, and even ethyl group being more preferred.

The band gap of zinc oxide is 3.2 eV. The metal element contained in the organometallic compound contained in the composition of the present invention is a metal element of which oxide has a band gap smaller than 3.2 eV. The band gap of the oxide may be, for example, 1.5 eV or more and less than 3.2 eV. Examples of the metal element of which oxide has a band gap smaller than the zinc oxide band gap of 3.2 eV include titanium, tungsten, iron, copper, vanadium, and indium. Titanium oxide is 3.0 eV, tungsten oxide is 2.7 eV, iron oxide is 2.2 eV, copper oxide is 1.7 eV, vanadium oxide is 2.3 eV, and indium oxide is 2.5 eV. As the metal element, titanium is preferred.

Compounds containing a metal element of which oxide has a band gap less than 3.2 eV include those having an alkoxy group or an amino group as a ligand. Compounds having these ligands have good solubility with an organic zinc compound represented by formula (1) and an organic solvent to be described later and are easily made into a solution.

The organometallic compound having an alkoxy group may be, for example, a compound represented by the following general formula (2)

$$M\text{-}(OR^2)_x \qquad (2)$$

In the formula, $R^2$ is a linear or branched alkyl group with 1 to 8 carbons, M is a metal element of which oxide has a band gap of less than 3.2 eV, and X is an integer ranging from 1 to 8, depending on M $R^2$ is a linear or branched alkyl group. Specific examples of alkyl groups include methyl, ethyl, propyl, isopropyl, butyl, isobutyl, sec-butyl, tert-butyl, pentyl, isopentyl, neopentyl, tert-pentyl, hexyl, isohexyl, sec-hexyl, tert-hexyl, 2-hexyl, 2-ethylhexyl, and heptyl groups, with ethyl, propyl, isopropyl, and 2-ethylhexyl groups being preferred.

An organometallic compound having an amino group may be, for example, a compound represented by the following general formula (3)

$$M\text{-}(NR^3)_x \qquad (3)$$

In the formula, $R^3$ is a linear or branched alkyl group with 1 to 4 carbons, M is a metal element of which oxide has a band gap of less than 3.2 eV, and X is an integer ranging from 1 to 8, depending on M.

Specific embodiments of $R^3$ alkyl group are the same as those of $R^2$ alkyl group.

Specific examples of the organometallic compound are shown below.

TABLE 1

| Compound names | Chemical formula | Structure |
|---|---|---|
| Titanium (IV) isopropoxide | $[(CH_3)_2CHO]_4Ti$ | 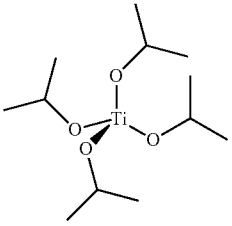 |
| Titanium (IV) ethoxide | $[(C_2H_5)O]_4Ti$ | 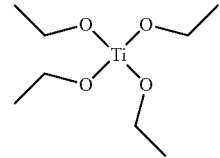 |
| Titanium normal butoxide | $[O(CH_2)_3CH_3]_4Ti$ | 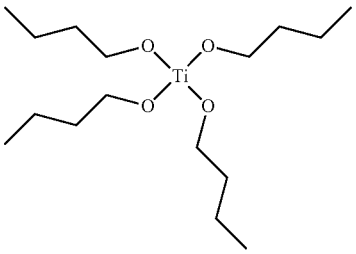 |
| Titanium (IV) tetrakis (2-ethylhexyloxide) | $[(C_8H_{17})O]_4Ti$ | 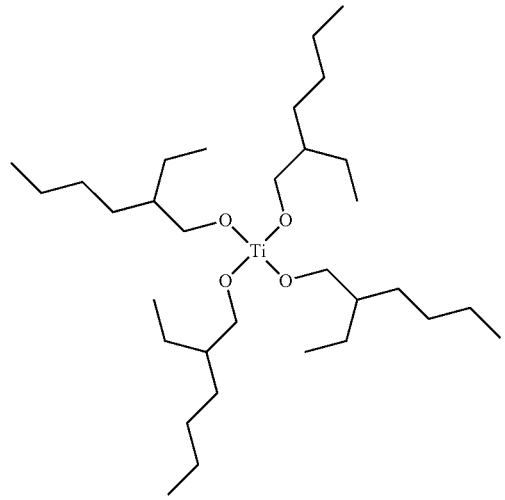 |

TABLE 1-continued

| Compound names | Chemical formula | Structure |
|---|---|---|
| Tetrakis (dimethylamino) titanium(IV) | $[(C_2H_6)N]_4Ti$ | |
| Ferrocene | $C_{10}H_{10}Fe$ | |
| Triisopropoxy vanadium(V) oxide | $[(C_3H_7)O]_3OV$ | |
| Zirconium (IV) propoxide | $[(C_3H_7)O]_4Zr$ | |

The added amount of compound containing a metal element of which oxide has a band gap of smaller than 3.2 eV is preferably such that the percentage (at %) of the metal element contained in the organometallic compound relative to the sum of the zinc element of the organic zinc compound represented by the general formula (1) and the metal element contained in the organometallic compound is in the range of 0.01 to 10 from the viewpoint of obtaining an effect of the present invention. This percentage (at %) is preferably in the range of 0.1 to 8.

When the organometallic compound is added to the extent exceeding 10 at % of the above percentage, the amount of elements other than zinc element increases in the film after the film is formed, and the crystallinity of the zinc oxide deteriorates, so that the shielding rate of UV-A region tends to decrease.

The composition of the present invention may further comprise an organic solvent. The organic solvent may be anyone having solubility to the organic zinc compound represented by formula (1) and the organometallic compound. The examples include electron-donating organic solvents and hydrocarbon compounds. Examples of the electron-donating organic solvent include cyclic amides such as N-methyl-2-pyrrolidone or 1,3-dimethyl-imidazolidinone and 1,3-dimethyl-3,4,5,6-tetrahydro-2(1H)-pyrimidinone, ethers such as diethyl ether, tetrahydrofuran, diisopropyl ether, dioxane, di-n-butyl ether, dialkyl ethylene glycol, dialkyl diethylene glycol, dialkyl triethylene glycol, and the like, and ether such as glyme, digyme, and triglyme-based solvent Examples of the hydrocarbon compound include an aliphatic hydrocarbon such as n-hexane, octane, n-decane, etc.; an alicyclic hydrocarbon such as cyclopentane, cyclohexane, methylcyclohexane, ethylcyclohexane, etc.; an aromatic hydrocarbon such as benzene, toluene, xylene, cumene, etc.; and a hydrocarbon solvent such as mineral spirits, sorbent naphtha, kerosene, petroleum ether, etc.

The organic solvent may be electron-donating solvent, hydrocarbon compound or mixtures thereof.

Methods for Enhancing UV-A Blocking Rate of Zinc Oxide Films

The present invention encompasses a method of increasing UV-A blocking rate of a zinc oxide film formed by applying a coating liquid containing an organic zinc compound represented by the above general formula (1) by droplet coating at a base material temperature of less than 200° C. In this process, an organometallic compound is contained in the coating liquid, and the metal element contained in the organometallic compound is a metal element of which oxide has a band gap of smaller than 3.2 eV.

In the method of the present invention, when UV-A blocking rate of the zinc oxide film formed using a coating liquid not containing the organometallic compound formed at the same base material temperature is set to 100, UV-A blocking rate of the zinc oxide film formed using a coating liquid containing the organometallic compound may be increased to 105 or more. The increase rate of UV-A blocking rate of the formed zinc oxide film varies depending on the temperature of the base material used and the type and amount of the organometallic compound to be added. By adjusting these conditions, UV-A blocking rate of the formed zinc oxide film may also be increased to 110 or more.

Further, in the method of the present invention, when the visible light region transmittance of the zinc oxide film formed using a coating liquid not containing the organometallic compound formed at the same base material temperature is set to 100, the visible light region transmittance of the zinc oxide film formed using a coating liquid containing the organometallic compound may be set to 80 or more. In other words, a zinc oxide film having high visible light region transmittance may be used. The visible light region transmittance of the formed zinc oxide film is more preferable as it is closer to 100.

The Method for Producing a Zinc Oxide Thin Film

The present invention encompasses a method for producing of a zinc oxide film. The method for producing of the present invention comprises droplet coating said composition of the present invention at a base material temperature below 200° C. to form a zinc oxide film.

As a method of coating a composition for forming a zinc oxide film on a base material, any method may be used as long as a zinc oxide film having a constant film thickness may be formed on a base material, and for example, a droplet coating method which is a deposition method capable of vaporizing at atmospheric pressure is preferred, and as a droplet coating method, for example, a spray coating method or a mist CVD method is preferred. The spray coating method is a method of spraying a coating liquid from a nozzle, and examples thereof include a method described in Patent Reference 2. The mist CVD method is a method in which a coating liquid is converted into a mist by an ultrasonic mist generating device or the like, and this mist is supplied to a surface of a base material. For example, the method described in Patent Reference 3 may be referred to.

When a composition of the present invention is applied to a base material, the temperature of the base material is not particularly limited as long as it is less than 200° C. Further, the base material may be at room temperature without heating. However, when the temperature of the base material is higher, the crystallinity of the obtained zinc oxide is increased, and the density is also increased, and the ultraviolet absorbing property is also increased. For example, it is in a range of 80° C. or more and less than 200° C. However, from the viewpoint of enhancing the ultraviolet absorbing property while considering heat resistance, it is preferable that the temperature is in the range of 90 to 160° C.

The atmospheric temperature for applying the liquid droplets is preferably in the range of 10 to 30° C. from the viewpoint that the zinc oxide film is easily formed.

When the composition for forming a zinc oxide film is applied to a base material, the atmosphere is not particularly limited, but may be carried out under atmospheric pressure, under pressure, or under reduced pressure. However, it is preferable to perform under an atmosphere in which water that is an oxygen source of the zinc oxide film is present. Under pressure is the case where the pressure is, for example, in the range of 101.3 to 202.6 kPa. Note that, although the liquid droplet coating process in the present invention may be performed even under reduced pressure, there is no advantage to be carried out under reduced pressure, and it is also convenient and preferable to carry out at atmospheric pressure in terms of device.

The coating on the surface of the base material is preferably performed in "an atmosphere in which water is present," and the "atmosphere in which water is present" may be, for example, an atmosphere of air containing water having a relative humidity of 10 to 90%. It may be carried out under an atmosphere of a mixed gas in which nitrogen and water are mixed instead of being carried out in an atmosphere of air. The relative humidity is more preferably 30 to 70% from the viewpoint that the zinc oxide thin film is produced easily.

In the method for producing the present invention, when UV-A blocking rate of the zinc oxide film formed using a coating liquid not containing the organometallic compound formed at the same base material temperature is set to 100, it is preferable to obtain a zinc oxide film having a UV-A blocking rate of 105 or more, and more preferably, to obtain a zinc oxide film having a UV-A blocking rate of 110 or more.

Further, it is preferable that the zinc oxide film formed by the producing method of the present invention is a zinc oxide film in which the shielding rate of the ultraviolet region UV-A is 70% or more. The shielding rate of the ultraviolet region UV-A is defined and measured as follows. The shielding rate of the ultraviolet ray region UV-A is, as described JIS-7079, a numerical value obtained by subtracting the average of the transmittance of light rays ranging from 315 nm to 380 nm from 100 and is measured by an ultraviolet-visible photometer.

In the method for producing the present invention, it is preferable to obtain a zinc oxide film having a visible light region transmittance of 80 or more, and more preferably, a zinc oxide film having a visible light region transmittance of 80 or more, when the visible light region transmittance of the zinc oxide film formed using a coating liquid not containing an organometallic compound formed at the same base material temperature is set to 100. The visible-light transmittance of the zinc oxide film may be appropriately adjusted depending on the base material temperature, the organometallic compound contained in the coating liquid, the type and the amount, and the like.

The zinc oxide thin film formed by the producing method of the present invention preferably has an average transmittance of 80% or more with respect to visible light, and more preferably has an average transmittance of 85% or more with respect to visible light. The term "average visible light transmittance" is defined and measured as follows. Average transmittance for visible light is the average of transmittance for light ranging from 380 nm to 780 nm, as described JIS-7079, and is measured by an ultraviolet-visible spectrophotometer.

In the present invention, a base material for forming a zinc oxide film is not particularly limited in material, shape, dimension, and the like, and examples thereof include an inorganic material such as glass, metal, and ceramic, a resinous base material such as plastic, an organic material such as paper, and wood, and a composite thereof.

The film thickness of the zinc oxide film formed by the producing method of the present invention is preferably 1 µm or less, and the film thickness may be adjusted by the composition of the coating liquid, the coating amount per unit area of the base material, and the like.

EXAMPLE

Hereinafter, the present invention will be described more specifically based on Examples, Synthetic Examples, Reference Examples, and Comparative Examples, but the present invention is not limited to the following Examples.

The spray-film forming device shown in FIG. 1 was used to form a zinc oxide film in Examples, Comparative Examples, and Reference Examples. In the drawing, 1 denotes a spray bottle filled with a coating liquid, 2 denotes a base material holder, 3 denotes a spray nozzle, 4 denotes a compressor, and 5 denotes a base material. Spray application was carried out as follows: The base material was placed in the base material holder 2 and heated to a predetermined temperature using a heater if necessary. Thereafter, compressed inert gas and coating liquid were simultaneously supplied from spray nozzle 3 disposed above the base material in the atmosphere (in the air under the atmospheric pressure), an atomized coating liquid was sprayed to form a zinc oxide thin film on the base material. A zinc oxide thin film was formed by the spray coating without additional heating or the like.

The structures of zinc oxide film in Examples, Comparative Examples, and Reference Examples were identified by X-ray diffractometry (XRD), film thickness measurement, and visible-light transmission measurement.

X'pert PRO MRD manufactured by PANalytical Co. was used for X-ray diffractometry (XRD). A 1.8 kW CuKα source (8048 eV) was used as the X-ray source. X-rays were parallelized by X-ray Mirror, and grazing incidence X-ray diffractometry was performed to operate the 2θ-axis incident on the sample at an angle of about 1°. The diffracted X-rays from the sample were collimated by a collimator and detected by a proportional counter.

Visible-light transmission was measured using a UV-2450V manufactured by SHIMADZU. The transmittance measurement was carried out by a measurement method using an integrating sphere unit. The measurement was carried out in the range from a wavelength of 200 nm to a wavelength of 800 nm. The absorption coefficient was calculated using the obtained integrating sphere transmission spectrum and the absorption energy (band gap) was obtained from the calculated absorption coefficient. The absorption edge wavelength was calculated by converting the absorption energy into a wavelength. The transmittance of the visible light region (580 nm) was acquired by using the obtained integrating sphere spectrum. Integrated region spectra were used to determine the shielding factor in the ultraviolet UV-A (315 nm-380 nm). The following equation was used to calculate the shielding ratio.

Ultraviolet UV-A shielding ratio=100−Mean transmittance of UV-A in the ultraviolet region For film thickness, a Bruker Dektak stylus profiling system was used. Film thickness was measured by measuring the step on the sample surface by linearly moving the sample stage below the diamond stylus and above a precise reference surface.

Example 1

Solutions were prepared in a nitrogen-gas atmosphere, and all of solvents were dehydrated and degassed for use. To 80.01 g of xylene, 4.22 g of diethylzinc was added. Thereafter, 0.25 g of titanium (IV) isopropoxide was added so that the titanium element contained in the organometallic compound became 3 at % with respect to the sum of the zinc element of diethylzinc and the titanium element contained in the organometallic compound. A coating liquid was obtained by sufficiently stirring.

The coating liquid obtained above was filled into the spray bottle of the spray-film forming device of FIG. 1. 5 cm×5 cm EAGLE XG manufactured by CORNING Co., Ltd. was placed in a base material holder, and heated to 100° C. Thereafter, the coating liquid was set at 1 ml/min and nitrogen, a carrier gas, was set at 8 L/min and sprayed for 8 minutes from the spray nozzle in air in which water was present, 50% relative humidity, at atmospheric pressure and 25° C. Atomax nozzle AM6 type made by ATOMAX Co. was used as the spray nozzle. The size of the droplets discharged from the spray nozzle ranged from 3 to 20 μm, and the distance between the spray nozzle and the base material was 20 cm to obtain a zinc oxide film. Film thickness was 136 nanometers.

The transmission spectrum of the obtained zinc oxide film was measured, and the mean transmittance in the visible-light region and the absorption edge of the zinc oxide were measured. The results of measurements of the transmittance and UV-A shielding factor in the visible light region (580 nm) are shown in Table 2.

Example 2

Titanium (IV) isopropoxide was added in the same manner as in Example 1, except that the amount of the isopropoxide was changed to 0.43 g (4 at % of the titanium element contained in the organometallic compound relative to the sum of the zinc element of diethylzinc and the titanium element contained in the organometallic compound), and a zinc oxide film was obtained. Film thickness was 153 nm. The transmission spectrum of the obtained zinc oxide film was measured, and the mean transmittance in the visible-light region and the absorption edge of the zinc oxide were measured. The results of measurements of transmittance and UV-A shielding in the visible light region (580 nm) are shown in Tables 2 to 3. XRD-measurement was performed to identify the structure of the film, but only the diffraction peak of zinc oxide was confirmed, and the diffraction peak derived from titanium was not confirmed.

Example 3

Titanium (IV) isopropoxide was added in the same manner as in Example 1, except that the amount of the isopropoxide was changed to 0.67 g (6 at % of the titanium element contained in the organometallic compound relative to the sum of the zinc element of diethylzinc and the titanium element contained in the organometallic compound), and a zinc oxide film was obtained. Film thickness was 119 nm. The transmission spectrum of the obtained zinc oxide film was measured, and the mean transmittance in the visible-light region and the absorption edge of the zinc oxide were measured. The results of measurements of the transmittance and UV-A shielding factor in the visible light region (580 nm) are shown in Table 2.

Example 4

A zinc oxide film was obtained in the same manner as in Example 2, except that titanium (IV) isopropoxide was changed to titanium (IV) ethoxide. Film thickness was 128 nm. The transmission spectrum of the obtained zinc oxide film was measured, and the mean transmittance in the visible-light region and the absorption edge of the zinc oxide were measured. The results of measurements of the transmittance and UV-A shielding factor in the visible light region (580 nm) are shown in Table 3.

Example 5

A zinc oxide film was obtained in the same manner as in Example 2, except that titanium (IV) isopropoxide was changed to titanium (IV) tetrakis (2-ethylhexyloxide). The transmission spectrum of the obtained zinc oxide film was measured, and the mean transmittance in the visible-light region and the absorption edge of the zinc oxide were measured. The results of measurements of the transmittance and UV-A shielding factor in the visible light region (580 nm) are shown in Table 3.

Example 6

A zinc oxide film was obtained in the same manner as in Example 2, except that titanium (IV) isopropoxide was made into tetrakis (dimethylamino) titanium (IV). Film thickness was 90 nm. The transmission spectrum of the obtained zinc oxide film was measured, and the mean transmittance in the visible-light region and the absorption edge of the zinc oxide were measured. Tables 2 to 4 show the results of measurements of transmittance and UV-A shielding factor in the visible light region (580 nm). XRD-measurement was performed to identify the structure of the film, but only the diffraction peak of zinc oxide was confirmed, and the diffraction peak derived from titanium was not confirmed.

Example 7

A zinc oxide film was obtained in the same manner as in Example 2, except that the titanium (IV) isopropoxide was made into tetrakis (dimethylamino) titanium (IV) and the heating temperature of the base material was changed to 150° C. Film thickness was 74 nm. The transmission spectrum of the obtained zinc oxide film was measured, and the mean transmittance in the visible-light region and the absorption edge of the zinc oxide were measured. The results of measurements of the transmittance and UV-A shielding factor in the visible light region (580 nm) are shown in Table 4.

Comparative Example 1

Solutions were prepared in a nitrogen-gas atmosphere, and all of solvents were dehydrated and degassed for use. To 162.52 g of xylene, 8.76 g of diethylzinc was added. A coating liquid was obtained by sufficiently stirring.

The coating liquid obtained above was filled into the spray bottle of the spray-film forming device of FIG. 1. An EAGLE XG manufactured by CORNING Co., Ltd., 5 cm×5 cm, was installed in a base material holder, heated to 100° C. Then the coating liquid was set at 1 ml/min and nitrogen, a carrier gas, was set at 8 L/min, and sprayed for 8 minutes from the spray nozzle in air in which water was present, 50% relative humidity, at atmospheric pressure and 25° C. Atomax nozzle AM6 type made by ATOMAX Co. was used as the spray nozzle. The size of the droplets discharged from the spray nozzle ranged from 3 to 20 μm, and the distance between the spray nozzle and the base material was 20 cm to obtain a zinc oxide film. Film thickness was 170 nm.

The transmission spectrum of the obtained zinc oxide film was measured, and the mean transmittance in the visible-light region and the absorption edge of the zinc oxide were measured. Tables 2 to 4 show the results of measurements of transmittance and UV-A shielding factor in the visible light region (580 nm).

Comparative Example 2

A zinc oxide film was obtained in the same manner as in Comparative Example 1, except that the heating temperature of the base material was changed to 150° C. Film thickness was 199 nm. The transmission spectrum of the obtained zinc oxide film was measured, and the mean transmittance in the visible-light region and the absorption edge of the zinc oxide were measured. The results of measurements of the transmittance and UV-A shielding factor in the visible light region (580 nm) are shown in Table 4.

TABLE 2

| | Solvent | Film forming temperature [° C.] | Organometallic compound | Amount added [at %] |
|---|---|---|---|---|
| Ex. 1 | Xylene | 100 | Titanium (IV) isopropoxide | 3 |
| Ex. 2 | | | | 4 |
| Ex. 3 | | | | 6 |
| Ex. 6 | | | Tetrakis(dimethyl-amino)titanium(IV) | 4 |
| Comp. Ex. 1 | | | — | — |

| | Visible light spectrum Transmittance [%] | Absorption edge [nm] | UV-A region Shielding ratio [%] | Ratio |
|---|---|---|---|---|
| Ex. 1 | 91.8 | 364 | 77.7 | 116% |
| Ex. 2 | 89.7 | 366 | 76.6 | 115% |
| Ex. 3 | 99.3 | 369 | 70.3 | 105% |
| Ex. 6 | 87.3 | 376 | 86.1 | 129% |
| Comp. Ex. 1 | 92.2 | 359 | 66.8 | 100% |

TABLE 3

| | Solvent | Film forming temperature [° C.] | Organometallic compound | Amount added [at %] |
|---|---|---|---|---|
| Ex. 2 | Xylene | 100 | Titanium (IV) isopropoxide | 4 |
| Ex. 4 | | | Titanium (IV) ethoxide | 4 |
| Ex. 5 | | | Titanium(IV) tetrakis(2-ethyl-hexyloxide) | 4 |
| Ex. 6 | | | Tetrakis(dimethyl-amino)titanium(IV) | 4 |
| Comp. Ex. 1 | | | — | — |

| | Visible light spectrum Transmittance [%] | Absorption edge [nm] | UV-A region Shielding ratio [%] | Ratio |
|---|---|---|---|---|
| Ex. 2 | 89.7 | 366 | 76.6 | 115% |
| Ex. 4 | 96.0 | 363 | 75.5 | 113% |
| Ex. 5 | 91.1 | 366 | 80.3 | 120% |
| Ex. 6 | 87.3 | 376 | 86.1 | 129% |
| Comp. Ex. 1 | 92.2 | 359 | 66.8 | 100% |

TABLE 4

| | Solvent | Film forming temperature [° C.] | Organometallic compound | Amount added [at %] |
|---|---|---|---|---|
| Ex. 6 | Xylene | 100 | Tetrakis(dimethyl-amino)titanium(IV) | 4 |
| Comp. Ex. 1 | Xylene | | — | — |
| Ex. 7 | Xylene | 150 | Tetrakis(dimethyl-amino)titanium(IV) | 4 |

TABLE 4-continued

| Comp. Ex. 2 | Xylene | — | — | |
|---|---|---|---|---|

| | Visible light spectrum Transmittance [%] | Absorption edge [nm] | UV-A region Shielding ratio [%] | Ratio |
|---|---|---|---|---|
| Ex. 6 | 87.3 | 376 | 86.1 | 129% |
| Comp. Ex. 1 | 92.2 | 359 | 66.8 | 100% |
| Ex. 7 | 90.1 | 377 | 82.7 | 104% |
| Comp. Ex. 2 | 91.4 | 377 | 79.4 | 100% |

INDUSTRIAL APPLICABILITY

The present invention is useful in the field of producing zinc oxide thin films useful as ultraviolet absorbing film and the like.

The invention claimed is:

1. A composition for producing a zinc oxide thin film by a liquid drop coating method at a base material temperature of less than 200° C., comprising diethylzinc, an organometallic compound represented by the general formula (2):

$$M\text{-}(OR^2)_4 \qquad (2)$$

wherein $R^2$ is a linear or branched alkyl group having 1 to 4 carbon atoms and M is titanium, and an organic solvent selected from the group consisting of benzene, toluene, xylene, and cumene, and wherein a content of the organometallic compound is such that a percentage (at %) of the titanium contained in the organometallic compound relative to the sum of zinc in the diethylzinc and the titanium contained in the organometallic compound is in the range of 3 at % to 6 at %.

2. The composition according to claim 1, wherein $R^2$ is a linear or branched alkyl group having 2 to 4 carbon atoms.

3. The composition according to claim 1, wherein $R^2$ is a linear or branched alkyl group having 2 to 3 carbon atoms.

4. The composition according to claim 1, wherein the organic solvent is selected from the group consisting of toluene, xylene and cumene.

5. The composition according to claim 1, wherein the organic solvent is selected from the group consisting of toluene and xylene.

* * * * *